March 23, 1971  L. E. MURRAY, JR  3,572,338
MIXING AND DELIVERY APPARATUS
Filed Feb. 27, 1968  2 Sheets-Sheet 1
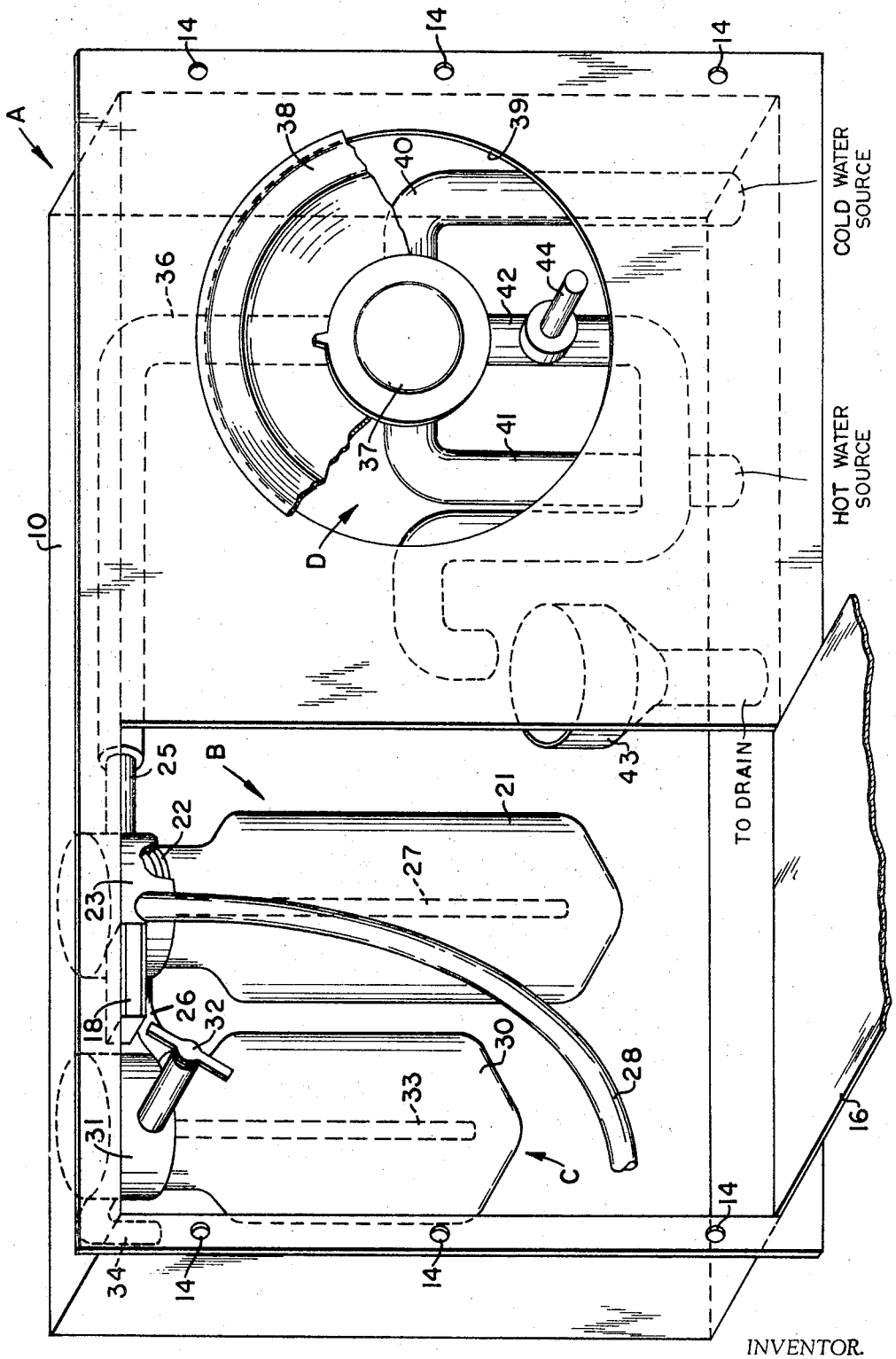
FIG_1
INVENTOR.
LEO. E. MURRAY, JR.
BY
Townsend and Townsend
ATTORNEYS

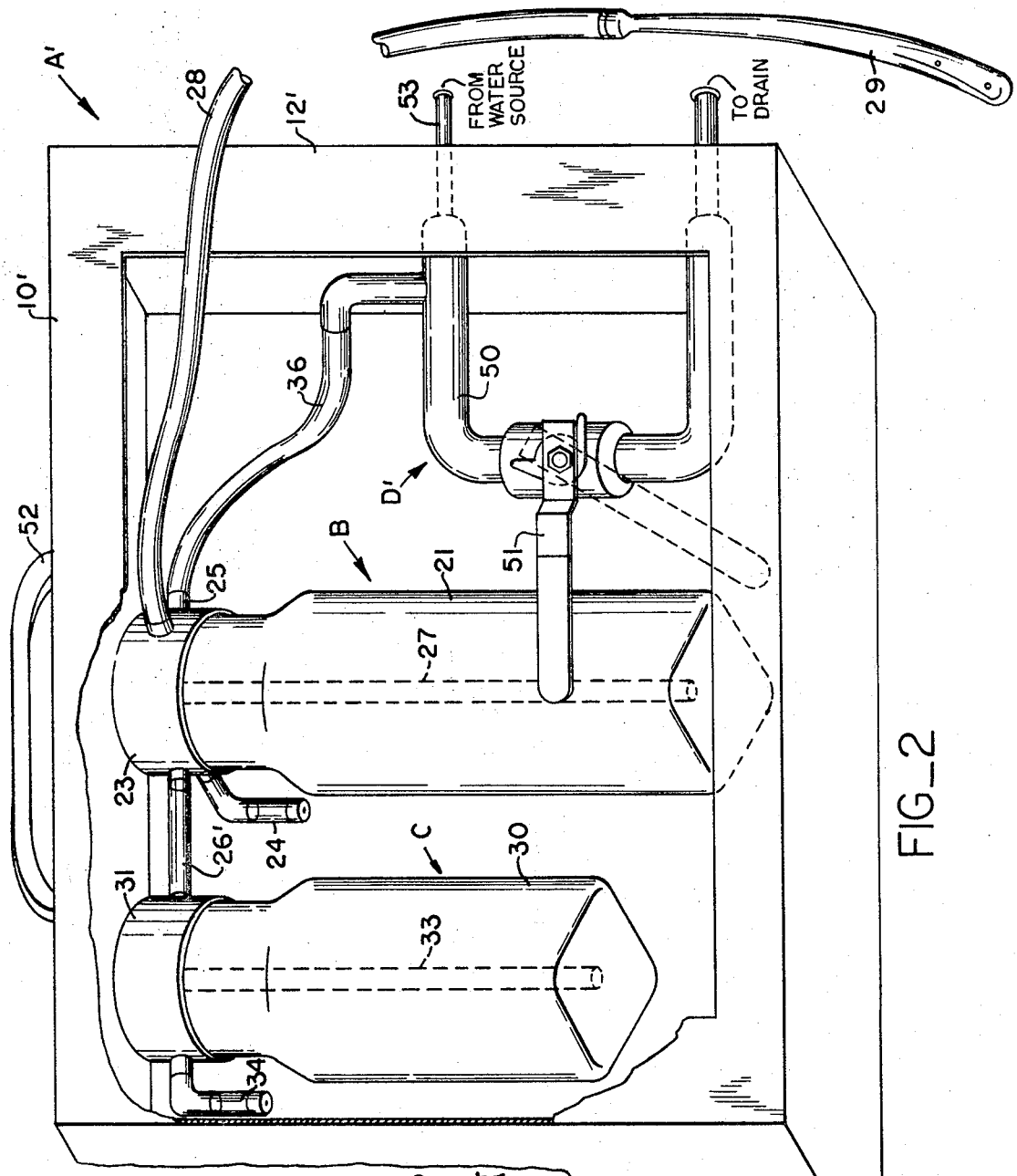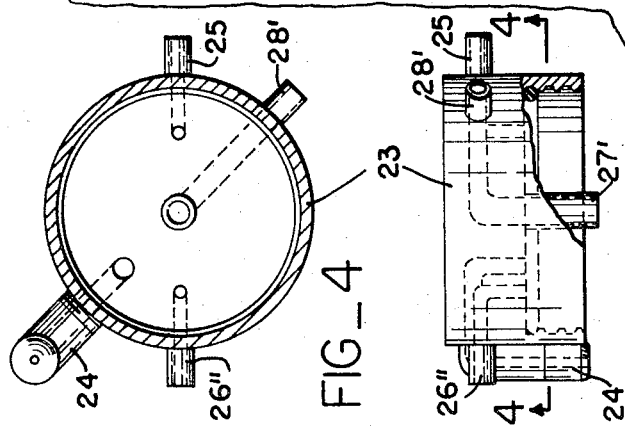

United States Patent Office 3,572,338
Patented Mar. 23, 1971

3,572,338
MIXING AND DELIVERY APPARATUS
Leo E. Murray, Jr., 2035 Main St.,
Fortuna, Calif. 95540
Filed Feb. 27, 1968, Ser. No. 708,654
Int. Cl. A61m 3/00
U.S. Cl. 128—229                                  5 Claims

ABSTRACT OF THE DISCLOSURE

A mixing and delivery apparatus including a chamber for mixing fluids, at least one of which is being introduced under pressure. Syphon means are provided in fluid communication with the chamber to deliver fluid overflowing therefrom. Means are also provided to allow for the automatic emptying of the chamber upon termination of pressurized fluid introduction.

---

This invention relates to a novel mixing and delivery apparatus and more particularly to a novel internal hygiene apparatus including a self-emptying mixing chamber.

The prior art is replete with apparatus for mixing and dispensing aqueous solutions for individual hygiene as well as for the internal irrigation or washing of deep wounds or skin abrasions, or in operating rooms for preparing skin surface for surgery. For example, U.S. Pat. No. 3,044,465, issued July 17, 1962, discloses a device including a receptacle for holding a chemical solution, a reservoir for heating a large amount of water, a chamber for mixing the water and chemical solution, and a mechanism for delivering the mixture for the desired use, such as a nozzle with an applicator end. However, such devices are usually quite cumbersome and of complex construction. They have the additional drawback of being difficult to clean and therefore are unsuitable for installations where employment involves the consecutive use by more than one person, such as in a motel or hotel unit.

Thus, it is a principal object of this invention to provide a device having a mixing chamber that is self-emptying and therefore self-cleaning upon completion of usage.

It is a further object of this invention to provide a device that can be fabricated in a compact and portable design so that it can be easily transported and attached to conventional bathroom outlets for hot and cold water.

It is another object of this invention to provide a device that enables the user to individually adjust or modify the temperature of the fluid being delivered through the device.

It is a further object of this invention to provide a device that is easily disassembled for cleaning or maintenance.

These objects will be better understood and other objects, features and advantages will become apparent when reference is made to the following detailed disclosure, especially in view of the attached drawings wherein:

FIG. 1 is a partially cutaway perspective view illustrating one embodiment of this invention;

FIG. 2 is a partially cutaway perspective view illustrating a second and portable embodiment of this invention;

FIG. 3 is a side elevational view of the mounting cap for the mixing chamber illustrated in FIG. 1; and FIG. 4 is a cross-sectional view taken along the line 4—4 of FIG. 3.

Referring now to the drawings wherein similar characters of reference represent corresponding parts in each of the several views, there is shown an internal hygiene apparatus enclosed in housing A suitable for permanent installation between the joists (not shown) of a bathroom wall such as in a home, hotel or motel facility. Housing A is fabricated of a rectangularly-shaped box 10 having a frontal piece 12 secured thereto in any conventional manner such as by welding. Frontal piece 12 includes a plurality of small openings 14 suitable for receiving screws (not shown) for supporting housing A as desired between the joists in the bathroom wall. It will be apparent to one skilled in this art that other means of positioning housing A can be employed as desired. Frontal piece 12 includes a pivotally mounted door member 16 that is maintained in a closed position by magnetic bar 18 when the device is not in use.

Within housing A are mounted mixing chamber assembly B, disinfectant assembly C and fluid temperature-adjusting means D. Mixing chamber assembly B includes a non-corrosive container of any conventional design such as a 10-ounce plastic squeeze bottle 21 having an externally threaded top 22. Bottle 21 is removably affixed to cylindrical mounting cap 23 by internal threads (not shown). Cap 23, machined from a non-corrosive metal such as brass, is mounted to housing A in a conventional manner. Cap 23, illustrated in more detail in FIGS. 3 and 4, provides liquid communication between squeeze bottle 21 and fluid temperature-adjusting means D through inlet 25, and between bottle 21 and disinfectant assembly C through inlet tubing 26.

Syphon tube 27 is also mounted on cap 23 and extends into squeeze bottle 21. Syphon tube 27 is connected through cap 23 to discharge tubing 28 and thence to applicator 29. Tube 27 is of sufficient length so that when squeeze bottle 21 is fully threaded into the corresponding threads on cap 23, the lower end of the tube 27 will be proximate the bottom of squeeze bottle 21.

Disinfectant assembly C includes a squeeze bottle 30 preferably of similar construction to squeeze bottle 21 but of a substantially smaller size. Squeeze bottle 30 is attached to cap 31 in a conventional manner such as by mating screw threads on the top of squeeze bottle 30 and within cap 31. Squeeze bottle 30 is in fluid communication with squeeze bottle 21 through conduit 33, cap 31, stop valve 32, inlet tubing 26, equipped with a one-way stop valve (not shown) and cap 23. Here again, conduit 33 is of a length sufficient to extend within squeeze bottle 30 to about the bottom thereof. Cap 31 is provided with a one-way valve 34 so that ambient air can be introduced to squeeze bottle 30 to replace disinfectant (not shown) removed therefrom by applying pressure to the sides of squeeze bottle 30.

Fluid temperature-adjusting means D includes delivery conduit 36 in fluid communication with inlet 25. Valve 37 including conventional face plate 38 is positioned within opening 39 in frontal piece 12 for convenient manipulation. When valve 37 is activated, cold water is allowed to flow through pipe 40 and hot water through pipe 41. Pipe 42 is provided to convey the mixture of hot and cold water to drain funnel 43. In this manner, the operator may initially make a manual determination as to the temperature of the water by placing a finger in the water flow between the end of pipe 42 and drain funnel 43. Once proper temperature adjustment has been obtained by manipulation of valve 37, plunger 44 is depressed, closing pipe 42 and thereby routing the flow of water through conduit 36 and inlet 25, and into mixing chamber annually B. It is preferable to form inlet 25 with a reduced cross section so that the water flowing therethrough will be caused to swirl and froth for more complete mixture with disinfectant.

In operation, a person intending to use the apparatus first transfer disinfectant from receptacle 30 to mixing chamber 21 by applying intermittent pressure to the flexible sides of chamber 30, i.e., by squeezing chamber 30. In this manner, the disinfectant is "pumped" through conduit 33 and 26 and out into squeeze bottle 21. Thereafter, stop valve 32 which was opened to allow egress of the disinfectant from chamber 30, is closed to prevent back flow from mixing chamber 21. Proper water temperature is obtained by manipulation of valve 37 during manual testing of the water exiting from pipe 42 into drain funnel 43. Once the proper temperature is attained, and the operator is prepared to employ the device, plunger 44 is depressed, thereby forcing the mixture of water through conduit 36 into mixing chamber assembly B.

The water flowing into chamber assembly B will swirl and froth, and thereby rapidly intermix with the disinfectant previously introduced into the chamber 21. Once chamber 21 is completely filled, the aqueous solution overflows through syphon tube 27, discharge tubing 28 and out of applicator 29. Of course, the intensity and continuity of flow of solution from chamber 21 through applicator 29 can be controlled by manipulation of valve 37. Once the intended use has been completed, valve 37 is closed to prevent further flow of water into conduit 36. The termination of water flow into assembly B would normally simultaneously terminate further egress of solution from applicator 29, thereby leaving assembly B filled with aqueous solution. However, by providing pipe 42 for introducing ambient air through conduit 36, inlet 25 and into mixing chamber assembly B, the aqueous solution will continue to flow through tube 27, discharge tubing 28, and out of applicator 29 until assembly 21 is empty. Of course, in order to accomplish this continued gravitational egress, applicator 29 must be maintained at an elevation below the bottom of container 21. In this manner, the aqueous contents of bottle 21 are syphoned therefrom at the termination of use and the apparatus is ready for subsequent employment without further complex cleaning.

Turning now to FIG. 2, there is illustrated a portable internal hygiene apparatus. Thus, housing A' is of a more compact nature and includes handle 52 attached to box member 10'. Frontal member 12' is provided with a pivotally-mounted door (not shown) similar to that previously described with reference to FIG. 1. Mixing chamber assembly B is substantially similar to the mixing chamber described with reference to FIG. 1 and includes squeeze bottle 21, mounting cap 23, fluid-connecting means 25, one-way valve 24 and tubing 26' equipped with a one-way valve (not shown) to provide for fluid flow to mixing chamber assembly B from assembly C. Again, conduit 27 is provided to extend from the bottom of the bottle out, through cap 23, via discharge tubing 28 to applicator 29.

Receptacle assembly C' again includes squeeze bottle 30, cap 31, one-way valve 34 and conduit 33.

Fluid temperature-adjusting assembly means D' has been slightly modified to provide for simple yet rapid attachment to a conventional plumbing system such as the faucets in a bathroom sink. Thus assembly D' includes conduit 50 attached to hot and cold water outlets (not shown) through slidable fitting 53 via a single flexible hose (in the case where the actual bathroom facility has a single faucet for delivering both hot and cold water) and a Y-shaped flexible hose (for delivery of water from a bathroom facility containing separate faucets for delivery of hot and cold water). A two-way valve 51 is also formed in U-shaped conduit 50. One leg of conduit 50 is connected via tubing 36 to outlet 25 and thence to mixing chamber assembly B. It is preferable that tubing 36 contain a spring-loaded check valve to prevent flow of water along tubing 36 when temperature adjustment is being accomplished. The second leg of U-shaped conduit 50 is preferably connected through flexible conduit (not shown) to a drain.

In operation, assembly A' is first connected to the bathroom water outlet via fitting 53. Two-way valve 51 is then positioned (in phantom) so that water flowing into fitting 53 passes completely through U-shaped conduit 50 and out to the drain. In this manner, the operator can test and adjust the water temperature before activating the device. Once the temperature is adjusted satisfactorily, disinfectant is transferred from squeeze bottle 30 to mixing chamber 21. Then valve 51 is moved to its alternate position (shown in solid lines), thereby closing U-shaped conduit 50 and directing water through conduit 36 and into mixing chamber 21. Here again, when mixing chamber assembly B is completely filled, continued introduction of water will cause the mixture to egress through conduit 27, discharge tubing 28 and applicator 29. When the use is completed, two-way valve 51 is returned to its first position. As a result of the normal elevational difference between assembly B and applicator 29 when in use, and the egress of air into assembly B through one-way valve 24, the fluid contents of bottle 21 will be substantially completely emptied. Thus the apparatus will be ready for subsequent use.

Turning now to FIGS. 3 and 4, it will be seen that mounting cap 23 is formed with four internal passages for providing the fluid communication herein described. Thus fitting 27' and 28' produce a continuous fluid path from tube 27 to discharge tubing 28. Similarly, fitting 26" provides disinfectant flow from tube 26 through cap 23 into bottle 21.

Although the foregoing invention has been described in some detail by way of illustration and example for purposes of clarity of understanding, it will be apparent to one skilled in the art that certain changes and modifications may be practiced within the spirit of the invention as limited only by the scope of the appended claims.

What is claimed is:

1. In an internal hygiene apparatus for effecting mixture and delivery of fluids, including a mixing chamber, a disinfectant chamber, first means in fluid communication with said mixing chamber for introducing a first disinfectant fluid therein from said disinfectant chamber, second means in fluid communication with said mixing chamber for introducing a second fluid under pressure to said chamber for intermixture with said first fluid, siphoning means having one end disposed within said mixing chamber near the bottom thereof, the other end disposed for delivery of the fluid mixture, said siphoning means having intermediate portion disposed above both ends thereof, and positioned for delivering a fluid mixture overflowing from said mixing chamber, the improvement comprising a cover member on said mixing chamber defining one end of said first and second fluid introducing means, said intermediate portion of said siphoning means and one-way valve means in said cover member for allowing entry only of air into said mixing chamber, wherein when said second fluid introducing means is activated to deliver said second fluid in an amount sufficient to overflow said mixing chamber, said overflow will occur only through said siphoning means and thereafter when said overflow is terminated, said air entry means will enable the residual fluid within said mixing chamber to continue to flow out through said siphoning means to automatically empty said mixing chamber.

2. Apparatus in accordance with claim 1 wherein said second fluid introducing means has a second end in fluid communication with means for manually adjusting the temperature of said second fluid.

3. Apparatus in accordance with claim 2 wherein said second fluid is water, and said manual adjusting means comprises a valve for apportioning the simultaneous flow of hot and cold water to provide water at the temperature desired.

4. Apparatus in accordance with claim 2 wherein said second fluid is water and said manual adjusting means are a pair of valves for apportioning the flow of hot and cold water to provide water at the temperature desired.

5. Apparatus in accordance with claim 1 wherein said mixing chamber is a plastic container having a neckeddown, threaded outlet for removable engagement with corresponding threads on said cover member.

References Cited
UNITED STATES PATENTS

| | | | |
|---|---|---|---|
| 2,396,043 | 3/1946 | Evans | 128—230 |
| 2,522,122 | 9/1950 | Kertesz | 128—229 |
| 3,044,465 | 7/1962 | Anderson et al. | 128—230 |
| 3,170,598 | 2/1965 | McPherson | 222—215X |
| 383,505 | 5/1888 | Wagner | 128—288 |

RICHARD A. GAUDET, Primary Examiner

J. YASKO, Assistant Examiner

U.S. Cl. X.R.

128—230